United States Patent

Maughan

[11] Patent Number: 6,019,541
[45] Date of Patent: Feb. 1, 2000

[54] RADIAL RING BEARING SET FOR BALL AND SOCKET JOINTS

[75] Inventor: Garth B. Maughan, Delta, Ohio

[73] Assignee: Dana Corporation, Toledo, Ohio

[21] Appl. No.: 09/188,841

[22] Filed: Nov. 9, 1998

[51] Int. Cl.[7] .................................................. F16C 11/00
[52] U.S. Cl. ........................ 403/140; 403/141; 403/143; 403/135; 403/122
[58] Field of Search .................................. 403/140, 135, 403/122, 127, 132, 133, 137, 141, 143

[56] References Cited

U.S. PATENT DOCUMENTS

| | | | |
|---|---|---|---|
| 3,154,333 | 10/1964 | Townsend | 403/122 |
| 3,506,288 | 4/1970 | Gottschald | 287/87 |
| 4,577,989 | 3/1986 | Ito | 403/140 |
| 4,690,581 | 9/1987 | Umemoto et al. | 403/133 X |
| 4,971,473 | 11/1990 | Schafer et al. | 403/140 |
| 4,986,688 | 1/1991 | Tuan et al. | 403/143 X |
| 4,995,755 | 2/1991 | Hyodo et al. | 403/133 |
| 5,395,176 | 3/1995 | Zivkovic | 403/122 |
| 5,564,853 | 10/1996 | Maughan | 403/137 |
| 5,697,723 | 12/1997 | Wood | 403/122 X |
| 5,704,727 | 1/1998 | Atkins et al. | 403/135 |
| 5,772,337 | 6/1998 | Maughan et al. | 403/137 X |

FOREIGN PATENT DOCUMENTS 0276420  8/1988  European Pat. Off. .

*Primary Examiner*—Lynne H. Browne
*Assistant Examiner*—John R. Cottingham
*Attorney, Agent, or Firm*—Rader, Fishman & Grauer PLLC

[57] ABSTRACT

A ball and socket joint includes a bearing set having an upper bearing and a lower bearing that have respective rim portions that are shaped for complementary overlapping engagement to create a radial and axial preload on a ball and socket joint assembly. The upper and lower bearings include generally spherical inner surfaces for contacting a ball stud outer surface. A socket housing includes a generally cylindrical inner wall for contacting outer surfaces of the upper and lower bearings. The upper and lower bearing rims overlap at a bearing to bearing interface that is preferably at the equator of the ball stud.

19 Claims, 2 Drawing Sheets

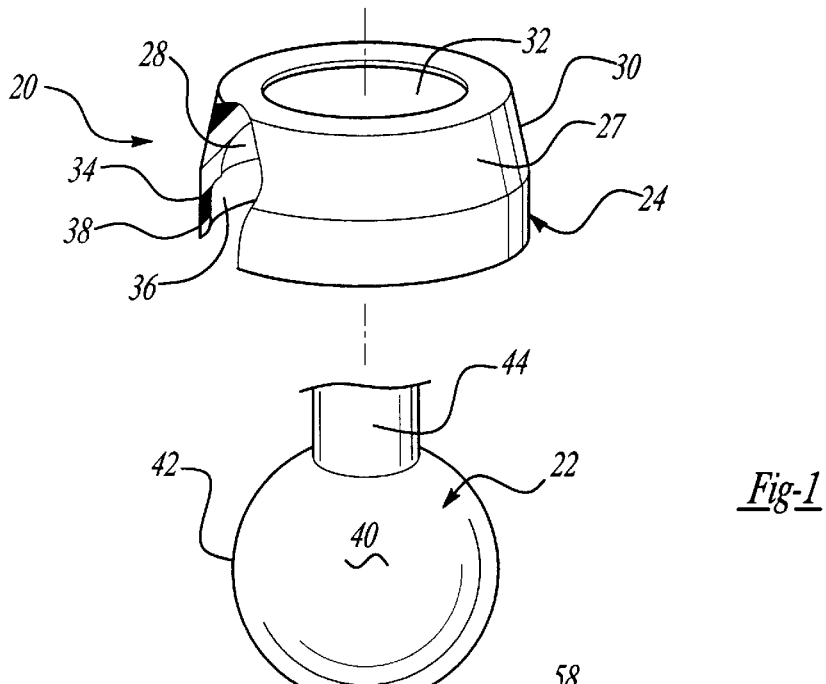
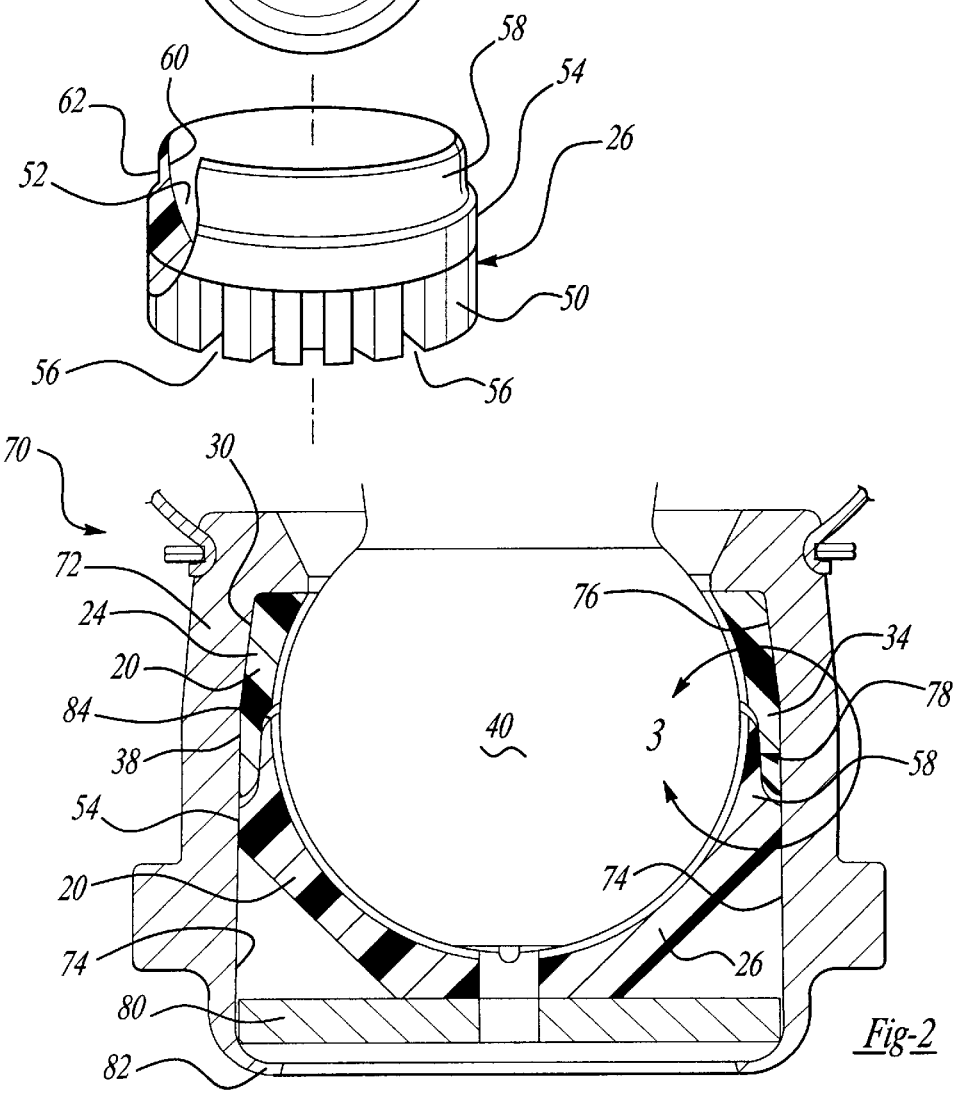
Fig-1
Fig-2

RADIAL RING BEARING SET FOR BALL AND SOCKET JOINTS

FIELD OF THE INVENTION

The present invention relates to ball and socket joints having a bearing set including an upper bearing and a lower bearing. More particularly, the present invention relates to a ball and socket joint having improved axial and radial preload capabilities.

BACKGROUND OF THE INVENTION

Ball and socket joints are applicable to a wide range of applications, including, for example, joints in steering linkages of automotive vehicles. Ball and socket joints typically include a cylindrical housing member adapted to receive a bearing together with a portion of a stud. The bearing reduces the amount of friction between the housing and the retained stud portion. The housing member typically is mechanically deformed during assembly to create a tight ball and socket joint.

However, known ball and socket joints cannot achieve adequate radial preloading derived from the axial preload during assembly. For example, to obtain a high radial preload by applying a substantial axial preload to a known ball and socket joint during assembly would cause deformation of the joint itself beyond utility. For instance, a large axial preload tends to flatten lubrication grooves and potentially crack the bearing or other components of the ball and socket joint. Moreover, a relatively high axial preload coupled with a relatively low radial preload can result in greater bearing wear and reduced life versus a more balanced approach to preloading.

SUMMARY OF THE INVENTION

The present invention is directed to a ball and socket joint that is easy to assemble and provides an extremely tight joint having a relatively high axial preload and a relatively high radial preload to create a tight ball and socket joint assembly. A ball and socket joint assembly of the present invention is applicable to a wide variety of applications, including, for example, joints for steering linkages for automotive applications. The present invention includes a bearing set for a ball and socket joint comprising a first bearing having a main body including a spherical inner surface for engaging a ball stud and an outer surface for engaging a socket housing. A first contoured rim is provided on the first bearing having an inner surface for contacting a ball stud and an outer surface having a predetermined cross-sectional profile. In addition, a second bearing is provided having a main body with a spherical inner surface for engaging a ball stud and an outer surface for engaging a socket housing. A second contoured rim is provided on the second bearing that has an inner surface with a complementary shaped profile for overlapping, mating engagement with the outer surface of the first contoured rim. The overlapping engagement occurs along a bearing interface for providing both axial and radial bearing preloads. The bearing interface can have any suitable shape that achieves a wedging effect, including for example, a generally S-shaped cross-section, tapered, or a generally V-shaped cross-section.

The present invention also includes a ball and socket joint assembly comprising a stud having a shank connected to a ball stud for insertion into a socket housing having an inner wall defining a cavity for receiving a bearing set and the ball stud. The bearing set includes first and second bearings located between the socket housing and the ball stud. The first bearing has a main body including a spherical inner surface for engaging the ball stud and an outer surface for engaging the socket housing. A first contoured rim extends from the main body of the first bearing and has an inner surface for contacting the ball stud and an outer surface having a predetermined cross-sectional profile. A second bearing has a main body including a spherical inner surface for engaging the ball stud and an outer surface for engaging the socket housing. A second contoured rim extends from the second bearing and has an inner surface with a complementary shaped profile for overlapping, mating engagement with the outer surface of the first contoured rim along a bearing interface for providing both axial and radial bearing preloads.

Further, the present invention includes a ball and socket joint assembly comprising a stud having a shank connected to a ball stud adapted to be inserted into a socket housing having an inner wall defining a cavity for receiving a bearing set and the ball stud. The bearing set includes first and second bearings located between the socket housing and the ball stud. In addition, the first bearing has a main body including a spherical inner surface for engaging the ball stud and an outer surface for engaging the socket housing. A first contoured rim is provided on the first bearing having an inner surface for contacting the ball stud and an outer surface having a predetermined cross-sectional profile. A second bearing has a main body including a spherical inner surface for engaging the ball stud and an outer surface for engaging the socket housing. A second contoured rim extends from the second bearing and has an inner surface with a complementary shaped profile for overlapping, mating engagement with the outer surface of the first contoured rim along a bearing interface for providing both axial and radial joint preloads. Moreover, the first and second contoured rims have an overlap thickness that is greater than a corresponding distance between the outer surface of the ball stud and the inner wall of the socket housing to create a radial preload. Preferably, the bearing interface is located at approximately the equator of the ball stud to efficiently preload both the ball stud and the socket housing.

The balanced axial and radial preloading of the present invention provides a greater range of tolerances in manufacturing of ball and socket joint components. Increased tolerances result in reduced production costs and reduced scrap rates. The axial and radial compression preloads also maintain tightness in the joint assembly by compensating for wear. Further, the present invention reduces looseness between the bearing and the ball stud as well as the looseness between the bearing and the inner housing wall. Thus, the present invention has an increased service life by minimizing unwanted looseness. The present invention efficiently converts a portion of the axial preload into a radial preload to produce a tight ball and socket joint that has minimal looseness.

BRIEF DESCRIPTION OF THE DRAWINGS

The features and inventive aspects of the present invention will become more apparent upon reading the following detailed description, claims, and drawings, of which the following is a brief description:

FIG. 1 is an exploded view of a bearing set and a ball stud according to the present invention.

FIG. 2 is a cross-sectional view of a joint assembly according to the present invention.

DETAILED DESCRIPTION OF PREFERRED EMBODIMENTS

Figure 3:
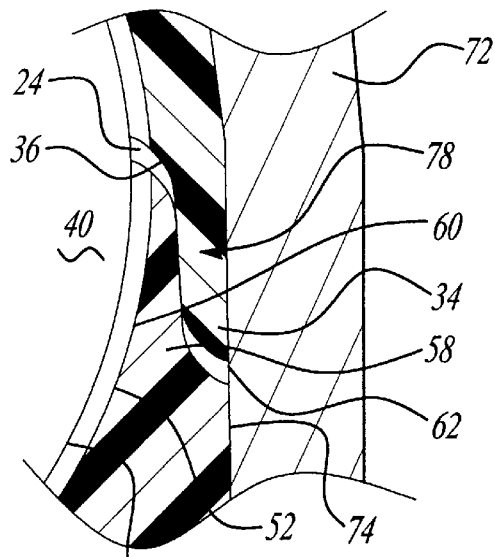
FIG. 3 is an enlarged view showing details from FIG. 2.

FIG. 1 shows an exploded view of a bearing set 20 and a stud 22 for use in a ball and socket joint assembly. Bearing set 20 includes a generally annular upper bearing 24 and a generally annular lower bearing 26. Upper bearing 24 has a main body 27 that includes a spherical inner surface 28 and a generally tapered outer surface 30. In addition, an opening 32 is provided in upper bearing 24 to provide passage of at least a portion of stud 22 during assembly. A contoured rim 34 extends axially from main body 27 and has a profiled inner surface 36 and an outer surface 38.

Stud 22 includes a ball stud 40 having a generally spherical outer surface 42. A shank 44 extends radially outwardly from ball stud 40 for attachment to a structural member (not shown). Lower bearing 26 includes a generally cylindrical main body 50 having a spherical inner surface 52 for engagement with ball stud outer surface 42. Outer surface 54 of main body 50 is generally cylindrical and optionally includes generally vertical slots 56 that are circumferentially spaced apart around the lower periphery of main body 50 to provide a relief path to avoid overloading of bearing set 20. A rim 58 extends upwardly from main body 50 and includes an inner surface 60 for contacting ball stud 40 and a contoured outer surface 62 that has a complementary shape to inner surface 36 of upper bearing rim 34. Upon assembly, upper bearing rim 34 slides over lower bearing rim 58 in overlapping, mating engagement.

FIG. 2 shows a cross-section of a ball and socket joint 70 having a socket housing 72 for receiving bearing set 20 and ball stud 40. Socket housing 72 includes a generally cylindrical inner housing wall 74 that has a tapered upper portion 76 that engages tapered outer surface 30 of upper bearing 24. Outer surface 38 of upper bearing rim 34 contacts socket housing inner wall 74 and outer surface 54 of lower bearing 26 also contacts housing inner wall 74. Upper bearing rim 34 and lower bearing rim 58 overlap at a bearing to bearing interface 78 at approximately the equator of ball stud 40 to preload ball and socket joint 70 in both an axial and a radial direction. Locating bearing to bearing interface 78 at or near the equator of ball stud 40 helps to efficiently distribute loading and permits a maximum amount of material to be used for forming both upper and lower bearings 24, 26. Upper bearing rim 34 and lower bearing rim 58 have a combined radial thickness at bearing to bearing interface 78 that is greater than the radial distance between ball stud outer surface 42 and inner housing wall 74 to insure a radial preload on both ball stud outer surface 42 and inner housing wall 74. A closure plate 80 abuts lower bearing 26 and is retained in socket housing 72 by deforming a lower lip 82 on socket housing 72. Such deformation produces an axial preload on ball and socket joint 70 by taking up any play between bearing set 20, socket housing 72, and ball stud 40. After axial preload is applied, a gap remains between upper bearing rim 34 and lower bearing rim 58 to create a circumferential lubrication groove 84 to insure that an adequate amount of lubricant is present in ball and socket joint 70 to improve joint life.

FIG. 3 shows an enlarged view of bearing to bearing interface 78 from FIG. 2 including a portion of socket housing 72 and a portion of ball stud 40. FIG. 3 shows lower bearing rim outer surface 62 having a generally S-shape for complementary overlapping engagement with upper bearing rim inner surface 36 which similarly has an S-shape. Upper bearing rim outer surface 28 has a generally cylindrical shape for contacting inner housing wall 74. Lower bearing rim inner surface 60 has a spherical shape that extends from spherical inner surface 52 for contacting outer surface 42 of ball stud 40.

Figure 4:
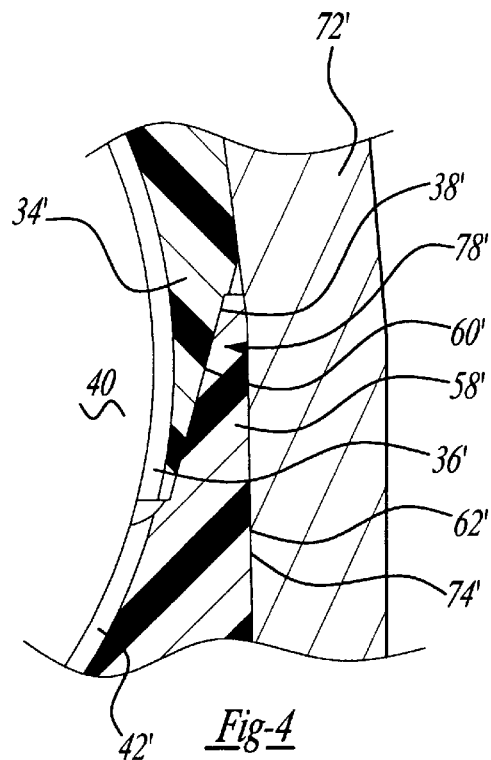
FIGS. 4 and 5 are detail views showing alternate embodiments of the present invention.

FIG. 4 shows an alternate embodiment according to the present invention in which a tapered cross-section is present at the bearing to bearing interface 78' instead of an S-shape. More specifically, upper bearing rim 34' includes an outer surface 38' that is generally tapered radially inwardly for complementary overlapping engagement with lower bearing rim inner surface 60'. In contrast to the previous embodiment, lower bearing rim 58' is located radially outwardly of upper bearing rim 34'. Thus, upper bearing rim inner surface 36' is generally spherical for contacting ball stud outer surface 42' while lower bearing rim outer surface 62' is designed to contact inner housing wall 74'.

Figure 5:
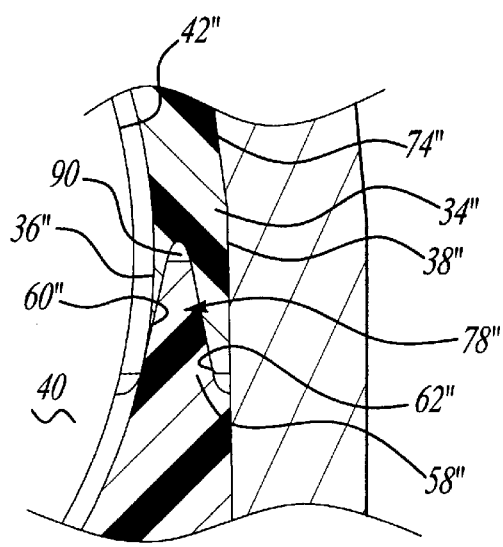

FIG. 5 shows a further embodiment of the present invention having a V-shaped cross-section at bearing to bearing interface 78". Lower bearing rim 58" has a generally triangular shape with tapered inner surface 60" and tapered outer surface 62". Upper bearing rim 34" has an innermost surface 36" having a generally spherical shape for contacting outer ball stud surface 42" and an outermost surface 38" for contacting inner housing wall 74". A generally V-shaped recess 90 is formed in upper bearing rim 34" to receive lower bearing rim 58" in complementary overlapping engagement.

In each of the disclosed embodiments, the shape of the upper and lower bearing rims is selected to achieve a wedging effect that allows an axial preload to be applied to the bearing set and at least a portion of the axial preload to be converted into a radial preload without damaging the functional integrity of the ball and socket joint.

For each of the illustrated embodiments, it should be understood that the respective rims of the upper and lower bearings can be interchanged or reversed such that the outermost rim becomes the innermost rim. Moreover, any suitable shape that creates a wedging effect can be utilized for the bearing to bearing interface cross-section.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A bearing set for a ball and socket joint comprising:
   a first bearing having a main body including a spherical inner surface for engaging a ball stud and an outer surface for engaging a socket housing;
   a first contoured rim provided on the first bearing having an inner surface for contacting a ball stud and an outer surface having a predetermined varying cross-sectional profile;
   a second bearing having a main body including a spherical inner surface for engaging a ball stud and an outer surface for engaging a socket housing;
   a second contoured rim provided on the second bearing having an inner surface with a complementary shaped varying profile for overlapping, mating engagement with the outer surface of the first contoured rim along a bearing interface for providing both axial and radial bearing preloads.

2. The bearing set of claim 1, wherein said bearing interface is generally tapered.

3. The bearing set of claim 1, wherein said bearing interface has a generally S-shaped cross-section.

4. The bearing set of claim 1, wherein said bearing interface has a generally V-shaped cross-section.

5. The bearing set of claim 1, wherein said bearing interface is located at a predetermined position for approximately corresponding to an equator of a ball stud.

6. A ball and socket joint assembly comprising:

a stud having a shank connected to a ball stud;

a socket housing having an inner wall defining a cavity for receiving a bearing set and said ball stud;

said bearing set comprising first and second bearings located between said socket housing and said ball stud;

said first bearing having a main body including a spherical inner surface for engaging said ball stud and an outer surface for engaging said socket housing;

a first contoured rim provided on the first bearing having an inner surface for contacting said ball stud and an outer surface having a predetermined varying cross-sectional profile;

a second bearing having a main body including a spherical inner surface for engaging said ball stud and an outer surface for engaging said socket housing;

a second contoured rim provided on said second bearing having an inner surface with a complementary shaped varying profile for overlapping, mating engagement with said outer surface of said first contoured rim along a bearing interface for providing both axial and radial bearing preloads.

7. The ball and socket joint assembly of claim 6, wherein said bearing interface is generally tapered.

8. The ball and socket joint assembly of claim 6, wherein said bearing interface has a generally S-shaped cross-section.

9. The ball and socket joint assembly of claim 6, wherein said bearing interface has a generally V-shaped cross-section.

10. The ball and socket joint assembly of claim 6, wherein said bearing interface is located at approximately the equator of said ball stud to efficiently preload both said ball stud and said socket housing.

11. The ball and socket joint assembly of claim 6, further including at least one circumferential lubrication channel defined by a gap between said first and second bearings and said ball stud.

12. The ball and socket joint assembly of claim 6, wherein said first and second contoured rims have an overlap thickness that is greater than a corresponding distance between the outer surface of said ball stud and the inner wall of said socket housing.

13. The ball and socket joint assembly of claim 6, wherein one of said first and second bearings includes a tapered outer surface and the inner wall of said socket housing includes a tapered for contacting the tapered outer surface of the one of said first and second bearings.

14. The ball and socket joint assembly of claim 6, wherein the inner wall of said socket housing includes a plurality of tapered surfaces.

15. A ball and socket joint assembly comprising:

a stud having a shank connected to a ball stud;

a socket housing having an inner wall defining a cavity for receiving a bearing set and said ball stud;

said bearing set comprising first and second bearings located between said socket housing and said ball stud;

said first bearing having a main body including a spherical inner surface for engaging said ball stud and an outer surface for engaging said socket housing;

a first contoured rim provided on the first bearing having an inner surface for contacting said ball stud and an outer surface having a predetermined varying cross-sectional profile;

a second bearing having a main body including a spherical inner surface for engaging said ball stud and an outer surface for engaging said socket housing;

a second contoured rim provided on said second bearing having an inner surface with a complementary shaped varying profile for overlapping, mating engagement with said outer surface of said first contoured rim along a bearing interface for providing both axial and radial joint preloads;

wherein said first and second contoured rims have an overlap thickness that is greater than a corresponding distance between the outer surface of said ball stud and the inner wall of said socket housing; and wherein said bearing interface is located at approximately the equator of said ball stud to efficiently preload both said ball stud and said socket housing.

16. The ball and socket joint assembly of claim 15, wherein one of said first and second bearings includes a tapered outer surface and the inner wall of said socket housing includes a tapered surface for contacting the tapered outer surface of the one of said first and second bearings.

17. The ball and socket joint assembly of claim 15, wherein said bearing interface is generally tapered.

18. The ball and socket joint assembly of claim 15, wherein said bearing interface has a generally S-shaped cross-section.

19. The ball and socket joint assembly of claim 15, wherein said bearing interface has a generally V-shaped cross-section.

* * * * *